US010518907B2

(12) United States Patent
Novotney et al.

(10) Patent No.: US 10,518,907 B2
(45) Date of Patent: Dec. 31, 2019

(54) SPACECRAFT DEVICE INITIATION SYSTEM

(71) Applicant: Ensign-Bickford Aerospace & Defense Company, Simsbury, CT (US)

(72) Inventors: David Novotney, Westfield, MA (US); Geoff Kaczynski, Westlake Village, CA (US); Craig Boucher, Simsbury, CT (US)

(73) Assignee: ENSIGN-BICKFORD AEROSPACE & DEFENSE COMPANY, Simsbury, CT (US)

( * ) Notice: Subject to any disclaimer, the term of this patent is extended or adjusted under 35 U.S.C. 154(b) by 302 days.

(21) Appl. No.: 15/263,695

(22) Filed: Sep. 13, 2016

(65) Prior Publication Data

US 2018/0072434 A1    Mar. 15, 2018

(51) Int. Cl.
*G05B 19/409* (2006.01)
*B64G 1/22* (2006.01)
(Continued)

(52) U.S. Cl.
CPC ........... *B64G 1/22* (2013.01); *G05B 19/0423* (2013.01); *G05B 19/409* (2013.01); *G05F 1/66* (2013.01); *G05B 2219/40513* (2013.01)

(58) Field of Classification Search
CPC .......... B64G 1/22; B64G 1/222; B64G 1/428; B64G 1/10; B64G 1/641; B64G 1/645;
(Continued)

(56) References Cited

U.S. PATENT DOCUMENTS 6,249,063 B1    6/2001  Rudoy et al.
6,422,145 B1 *  7/2002  Gavrilovic ............ F42C 13/047
                                                    102/200
(Continued)

FOREIGN PATENT DOCUMENTS

EP    1426291 A1    6/2004
WO    0171272 A2    9/2001
WO    2010117395 A1  10/2010

OTHER PUBLICATIONS

Catani et al., Electrostatic behaviour of materials in a charging space environment, 2004, IEEE, p. 1-10 (Year: 2004).*

(Continued)

*Primary Examiner* — McDieunel Marc
(74) *Attorney, Agent, or Firm* — Cantor Colburn LLP

(57) ABSTRACT

One aspect of the present disclosure involves a networked initiation system having one or more non-energetic hold-down and release mechanisms ("HDRMs"), a control unit and an interface bus connected between all of the HDRMs and the control unit. Other aspects of the present disclosure involve networked initiation systems having one or more of each of non-energetic HDRMs, energetic HDRMs and other (generic) energetic devices. The systems also include a control unit and an interface bus connected between all of the HDRMs and/or energetic devices and the control unit. The system may be used on a spacecraft for holding various elements in place on the spacecraft during launch, and then activating the HDRMs and/or energetic devices at selected points in time after launch to release the elements for movement, e.g., into orbit or beyond.

20 Claims, 4 Drawing Sheets

(51) Int. Cl.
*G05B 19/042* (2006.01)
*G05F 1/66* (2006.01)

(58) Field of Classification Search
CPC ................ B64G 2001/643; B64G 1/00; G05B 19/0423; G05B 19/409; G05B 2219/40513; G05F 1/66
See application file for complete search history.

(56) References Cited

U.S. PATENT DOCUMENTS

| | | | |
|---|---|---|---|
| 6,433,990 B1 | 8/2002 | Rudoy et al. | |
| 6,511,022 B1 | 1/2003 | Robinson | |
| 6,525,920 B2 | 2/2003 | Rudoy et al. | |
| 6,584,907 B2 | 7/2003 | Boucher et al. | |
| 6,747,541 B1 | 6/2004 | Holt et al. | |
| 6,889,610 B2 | 5/2005 | Boucher et al. | |
| 7,261,028 B2 | 8/2007 | DeVries et al. | |
| 7,278,658 B2 | 10/2007 | Boucher et al. | |
| 8,136,448 B2 * | 3/2012 | Nelson | F42D 1/05 102/215 |
| 8,213,151 B2 * | 7/2012 | Nelson | F42C 15/40 102/200 |
| 8,333,514 B2 * | 12/2012 | Weimer | G02B 23/16 384/434 |
| 9,115,970 B2 * | 8/2015 | DeVries | F42B 15/36 |
| 2018/0208331 A1 * | 7/2018 | Novotney | B64G 1/10 |

OTHER PUBLICATIONS

Kirby et al., Radiation Belt Storm Probe spacecraft and impact of environment on spacecraft design, 2012, IEEE, p. 1-20 (Year: 2012).*

Extended European Search Report and Written Opinion for Application No. EP17190741 dated Feb. 21, 2018; 7 pgs.

Budlong et al., 1a processor: Control system, 1977, IEEE, p. 135-179 (Year: 1977).

* cited by examiner

SPACECRAFT DEVICE INITIATION SYSTEM

BACKGROUND OF THE DISCLOSURE

The subject matter disclosed herein relates in general to the initiation of devices located on a spacecraft, and in particular to a system which controls the initiation of non-energetic hold-then-separate devices located on a spacecraft.

Launch vehicles typically have multiple stages and are used to carry payloads during travel away from the Earth's surface after the vehicles are launched, and then place or deploy the payloads into orbit or beyond. These payloads are commonly referred to as satellites if they are intended to orbit a body (e.g., Earth) after deployment, or as spacecraft if they are intended to leave the Earth's orbit after deployment. Sometimes the terms "satellites" and "spacecraft" are used interchangeably.

Spacecraft typically utilize hold-down and release mechanisms ("HDRMs") (i.e., a "hold-then-separate" device) to securely hold, retain or stow elements of the spacecraft during launch. These elements, such as solar arrays, antenna reflectors, radiators, instrument booms, propulsion pointing actuators, doors, sensors, etc., are deployed as desired by activating the hold-down and release mechanisms.

An HDRM is generally an electro-mechanical, "one-shot" device in that after it is activated to release its stowed or held element, the HDRM either needs to be replaced, refurbished, or reset—depending on the type of technology that the HDRM employs. An HDRM is typically not a motorized device or other type of device that will return to its original state without some type of external intervention.

HDRMs are generally broadly categorized into three different types: explosive, pyrotechnic, and non-explosive—depending upon the type of activation or actuation mechanism utilized. Explosive and pyrotechnic HDRMs are also both typically referred to as energetic HDRMs, while a non-explosive HDRM or a non-pyrotechnic HDRM is also typically referred to as a non-energetic HDRM. An explosive HDRM is one whose activation mechanism detonates on command, while a pyrotechnic HDRM is one whose activation mechanism burns or deflagrates on command. A non-energetic HDRM is one that typically utilizes an activation mechanism such as a fuse wire or link wire that heats and weakens on command from a control unit when an amount of electrical current passes through the wire, thereby causing it to melt and break. Other types of non-energetic HDRMs utilize a shape memory alloy or utilize the volumetric expansion of certain materials, such as paraffin, when changing from solid to liquid phase. For simplicity, the discussion herein will focus on the fuse wire or link wire style but it can be seen that embodiments of the present invention described herein would be applicable to all types of non-energetic HDRMs.

In a particular type of non-energetic HDRM, when the fuse wire breaks, a release wire that was wrapped around and thereby enclosing the two parts or halves of a cylindrical split spool assembly is released, thereby releasing for movement a pre-loaded device (e.g., a bolt) attached to the split spool assembly. Release of the bolt subsequently releases a stowed element of the spacecraft. This type of non-energetic HDRM is commonly referred to as a split spool release device ("SSRD"). Other common types of non-energetic HDRMs are commercially available.

In the relevant art, it is known that the relatively broad combination of a control unit, a plurality of energetic devices, and an interface bus through which signals (e.g., power and data) are sent and received as between the control unit or controller and the energetic devices (i.e., two-way communication) is generally referred to as a "networked initiation system." It is a distributed type architecture in which the various components (e.g., the control unit and the energetic devices) are located at different places on the vehicle and are all connected by the interface bus.

Networked initiation systems are known that are used strictly with various types of energetic devices. What is needed is a networked initiation system for use solely with non-energetic HDRMs. What is also needed is a networked initiation system for use with both non-energetic HDRMs, energetic HDRMs (i.e., a "mixed" network initiation system), and/or other (generic) energetic devices (such as a pyro valve or other energetic device used on a spacecraft).

BRIEF DESCRIPTION OF THE DISCLOSURE

According to an embodiment of the present invention, a networked initiation system includes one or more non-energetic hold-down and release mechanisms ("HDRMs"), a control unit and an interface bus connected between all of the HDRMs and the control unit.

According to another embodiment of the present invention, a networked initiation system includes one or more non-energetic HDRMs and one or more energetic HDRMs. The system also includes a control unit and an interface bus connected between all of the HDRMs and the control unit.

According to another embodiment of the present invention, a networked initiation system includes one or more non-energetic HDRMs, and one or more other (generic) energetic devices. The system also includes a control unit and an interface bus connected between all of the HDRMs, the other energetic devices and the control unit.

According to another embodiment of the present invention, a networked initiation system includes one or more energetic HDRMs, one or more non-energetic HDRMs, and one or more other (generic) energetic devices. The system also includes a control unit and an interface bus connected between all of the HDRMs, the other energetic devices and the control unit.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION OF THE DISCLOSURE

Figure 1:
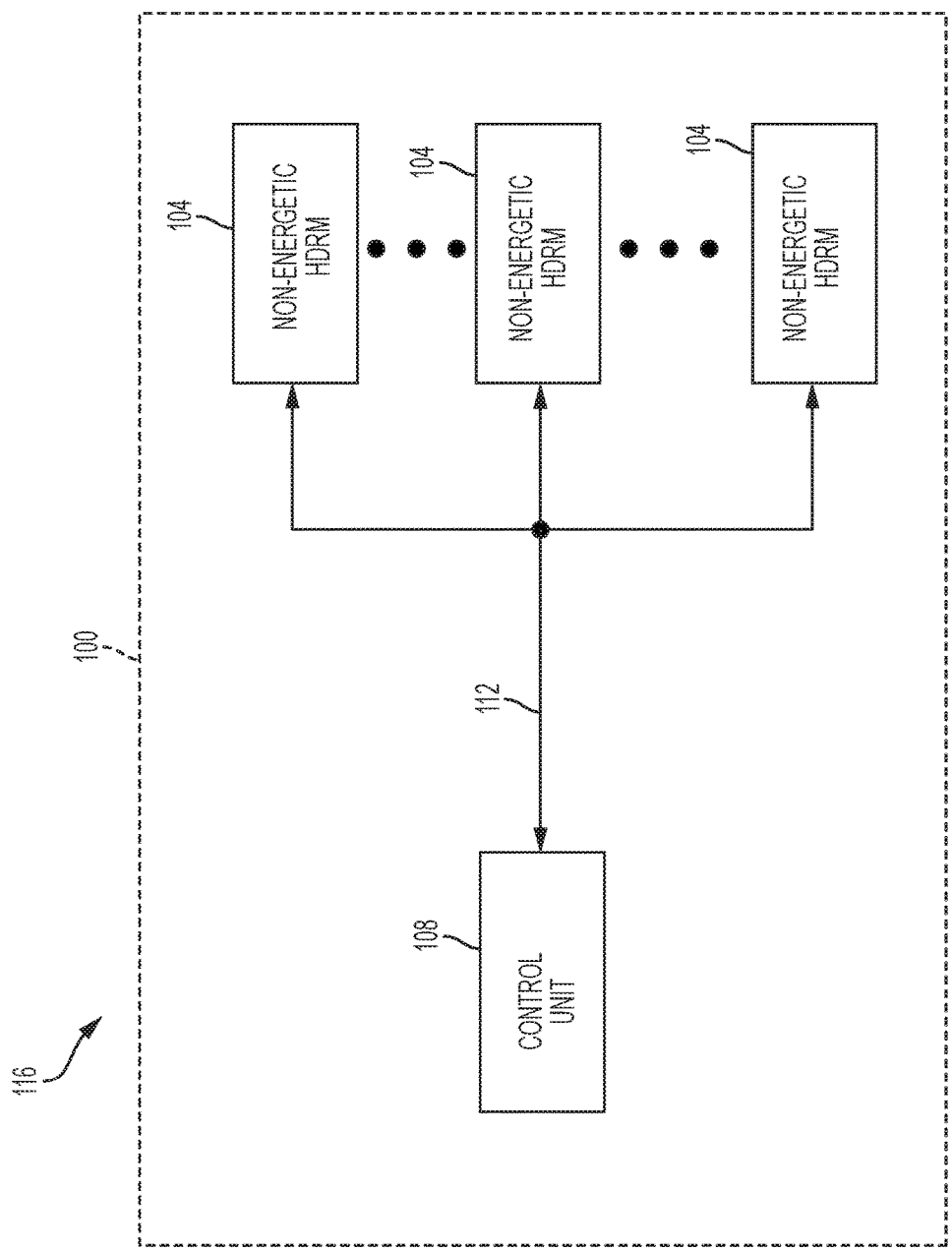
FIG. 1 is a schematic block diagram of a networked initiation system for use with one or more non-energetic HDRMs according to an embodiment of the present invention.

Referring to FIG. 1, a networked initiation system 100 according to an embodiment of the present invention includes one or more (i.e., "at least one") non-energetic hold-down and release mechanisms ("HDRMs") 104, a control unit 108, and an interface bus 112 connected between all of the HDRMs 104 and the control unit 108, all of the devices 104, 108 and the interface bus 112 being connected together in a "network" type configuration in the system 100. The interface bus 112 allows for two-way communication between any of the devices 104, 108 connected to the interface bus 112. "Non-energetic" also refers to the HDRMs 104 being primarily non-explosive and/or non-pyrotechnic in nature.

The networked initiation system 100 of FIG. 1 may be part of an aeronautical or aerospace type vehicle 116 utilized for travel away from the Earth's surface. However, embodiments of the present invention are not limited as such. Instead, as described in more detail hereinafter, the networked initiation system 100 may be utilized in land based applications such as various types of vehicles (e.g., an air bag deployment system in an automobile), or even stationary applications. The networked initiation system 100 may also be used in conjunction with devices or installations located underground, such as missile silos.

A non-energetic HDRM 104 typically includes an activation mechanism (not shown) such as a link wire or fuse wire that heats and weakens on command from a control unit when an amount of electrical current passes through the link wire, thereby causing it to melt or break relatively quickly from the time the command is given, which ultimately triggers the release of the retained or stowed element on the spacecraft.

Non-energetic HDRMs 104 (e.g., the aforementioned split spool release devices ("SSRDs")), may utilize an internal firing capacitor that stores an amount of electrical charge and then releases the charge on command to thereby transmit sufficient energy to break the link wire in the non-energetic HDRM 104 or the electrical charge may be obtained directly from the interface bus 112. When used, the capacitor may be configured to store electrical energy upon receipt of an arming signal on the interface bus 112. As such, the non-energetic HDRM 104 usually does not need any type of separate initiator device associated therewith, as compared to many types of energetic HDRMs, as discussed is more detail hereinafter. The internal firing capacitor and associated circuitry within the non-energetic HDRM 104 is typically referred to as a capacitive discharge firing unit.

The control unit 108 may comprise a computer, processor, logic array, or similar type of device and may be configured solely to perform the functions required by the networked initiation system 100 of embodiments of the present invention. In the alternative, the control unit 108 may be configured as a portion of a control unit that is configured to carry out other functions on the spacecraft 116 besides those of the networked initiation system 100. For example, the control unit 108 may be embodied within the main or primary mission or flight control computer for the spacecraft 116. On the other hand, if the control unit 108 is dedicated only to the networked initiation system 100, the control unit 108 may be in communication with the mission or flight control computer for the spacecraft 116.

In embodiments of the present invention, the interface bus 112 may comprise a multi-wire bus including separate wires or signal lines for functions such as arming power, operation power, communication and ground. The communication wire or wires may provide address, control, and data signals thereon, and these signals may be digitally coded in a known manner (e.g., the Manchester data bus format) to allow for unique addressing of multiple devices connected to the interface bus 112. In exemplary embodiments, the networked initiation system 100 may be capable of uniquely addressing more than 100 different devices (e.g., HDRMs 104, etc.) connected to the interface bus 112. Thus, each device connected to the interface bus 112 may include some amount of communication circuitry to allow each device to both receive and transmit signals (e.g., address and data) on the interface bus 112 between the control unit 108 and between other devices connected to the interface bus 112. Also, each device connected to the interface bus 112 may contain built-in-test ("BIT") circuitry to perform a self-test of the associated device at one or more defined points in time (e.g., upon power up) and to communicate the results of the BIT to the control unit 108.

Although not an inherent limitation, a typical networked initiation system 100 may include anywhere from 2 to 100 devices connected to the interface bus 112 for two-way communication with the control unit 108. However, by providing the capability to uniquely address and communicate with such a relatively large number of individual devices, embodiments of the networked initiation system 100 of the present invention have an advantage in that the system is scalable. This scalability creates a relatively large amount of flexibility in a networked initiation system 100 by allowing for the easy addition (and subtraction) of uniquely addressable devices within the system 100 in the future without having to reconfigure the system 100—i.e., the controller 108 and the interface bus 112. Each new device connected to the interface bus 112 at a later point in time may simply be assigned one of the remaining available unique addresses at that time.

Other advantages of the single interface bus 112 include that fact that such an interface bus 112 simplifies the overall system wiring, thereby reducing size, weight and power and eliminating undesirable complexity of the networked initiation system 100, while also simplifying the electrical wiring harness required within the physical makeup of the networked initiation system 100.

Thus, as seen from the foregoing, each of the non-energetic HRDMs 104 connected to the interface bus 112 for two-way communication with the control unit 108 may be considered to be a "smart" device in that it not only contains the payload release mechanism but it also contains the electrical or electronic circuitry needed for communication on the interface bus 112 with the control unit 108. The circuitry may include that needed for arming and firing the specific HDRM 104 as well as for BIT of the HDRM 104 and for communicating the then-current state of the HDRM 104 (e.g., armed, ready to fire, etc.) to the control unit 104. In other words, the control unit 108 may communicate with the HDRMs 104 and sensors 120 in a "command and response" type protocol.

Figure 2:
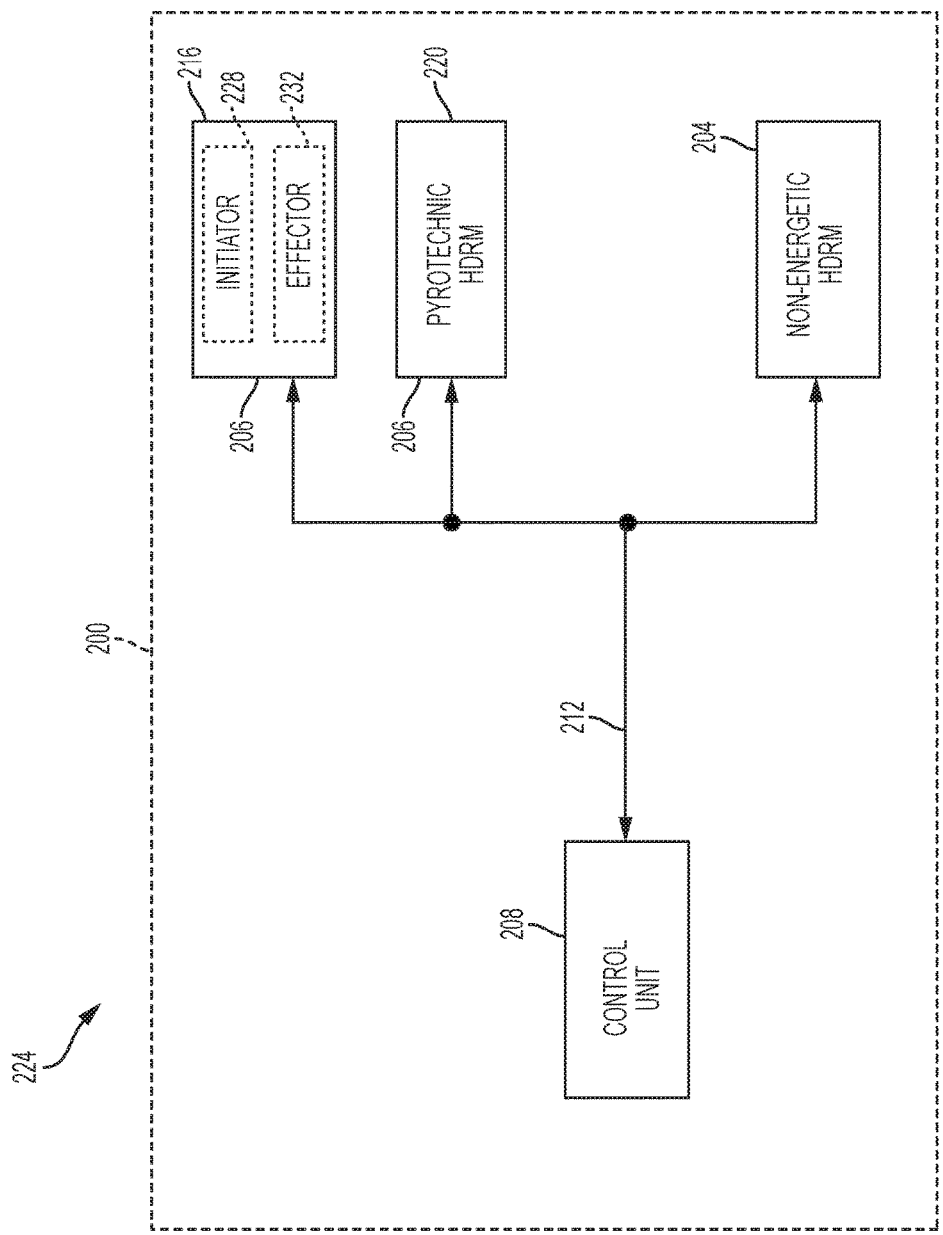
FIG. 2 is a schematic block diagram of a networked initiation system for use with one or more of each of non-energetic HDRMs and energetic HDRMs according to an embodiment of the present invention.

Referring now to FIG. 2, a networked initiation system 200 according to another embodiment of the present invention includes one or more (i.e., "at least one") non-energetic HDRMs 204, together with one or more (i.e., "at least one")

energetic HDRMs 206. The networked initiation system 200 also includes a control unit 208 and an interface bus 212 connected between all of the non-energetic HDRMs 204 and the energetic HDRMs 206 as well as to the control unit 208, thereby allowing for two-way communication between all of the devices connected to the bus 212. Similar to the networked initiation system 100 of FIG. 1, all of the devices 204, 206, 208, and the bus 212 are connected together in a "network" type configuration in the system 200 of FIG. 2. In addition, "energetic" also refers to the HDRMs 206 being either explosive or pyrotechnic in nature. For example, FIG. 2 depicts both an explosive HDRM 216 and a pyrotechnic HDRM 220 as separate devices.

The embodiment of the networked initiation system 200 of FIG. 2 is similar in most aspects to the embodiment of the networked initiation system 100 of FIG. 1, primarily except for the addition of the energetic HDRMs 206 to the system 200. As such, the description of the networked initiation system 100 given hereinabove with respect to FIG. 1 is mostly applicable to the networked initiation system 200 of FIG. 2. Also, the addition of the energetic HDRMs 206 to a system (such as that of FIG. 1) having non-energetic HDRMs 204 results in what may be referred to as a "mixed" type of networked initiation system 200, as shown in FIG. 2.

The networked initiation system 200 of FIG. 2 may be part of an aeronautical or aerospace type vehicle 224 utilized for travel away from the Earth's surface. However, embodiments of the present invention are not limited as such. Instead, as described in more detail hereinafter, the networked initiation system 200 may be utilized in land based applications such as various types of vehicles (e.g., an air bag deployment system in an automobile), or even stationary applications. The networked initiation system 100 may also be used in conjunction with devices or installations located underground, such as missile silos.

An energetic HDRM 206 typically comprises an initiator 228 and an effector 232, as shown in FIG. 2 for the explosive HDRM 216. For example, for aeronautical and aerospace vehicles, an initiator 228 that controls an explosive or pyrotechnic (i.e., energetic) effector 232 typically may comprise a hot bridgewire type of initiating element, while the effector 232 is responsive to the initiating element 228. As such, the energetic HDRM 206 may include within its device package both the initiating element or initiator 228 and the effector 232.

Various types of explosive HDRMs 216 and pyrotechnic HDRMs 220 include, for example, separation bolts, frangible nuts, bolt cutters, fairing release devices, actuators, engine igniters, cable cutters, etc. These types of explosive and pyrotechnic devices are commonly referred to as "reactive" effectors 232. Such reactive effectors 232 are typically coupled to electrically operated initiators which, in response to suitable control signals on the bus 212, initiate or activate the effectors 232.

As discussed hereinabove, the initiators 228 for use in the various types of HDRMs 216 may include their own communication and control circuitry. As a result, the individual initiators possess decision-making ability, and may be referred to as "intelligent" initiators. The initiators may also be equipped with sensors or other diagnostic circuitry whose condition is checked for satisfactory output before functioning is permitted to occur (i.e., the aforementioned BIT).

Figure 3:
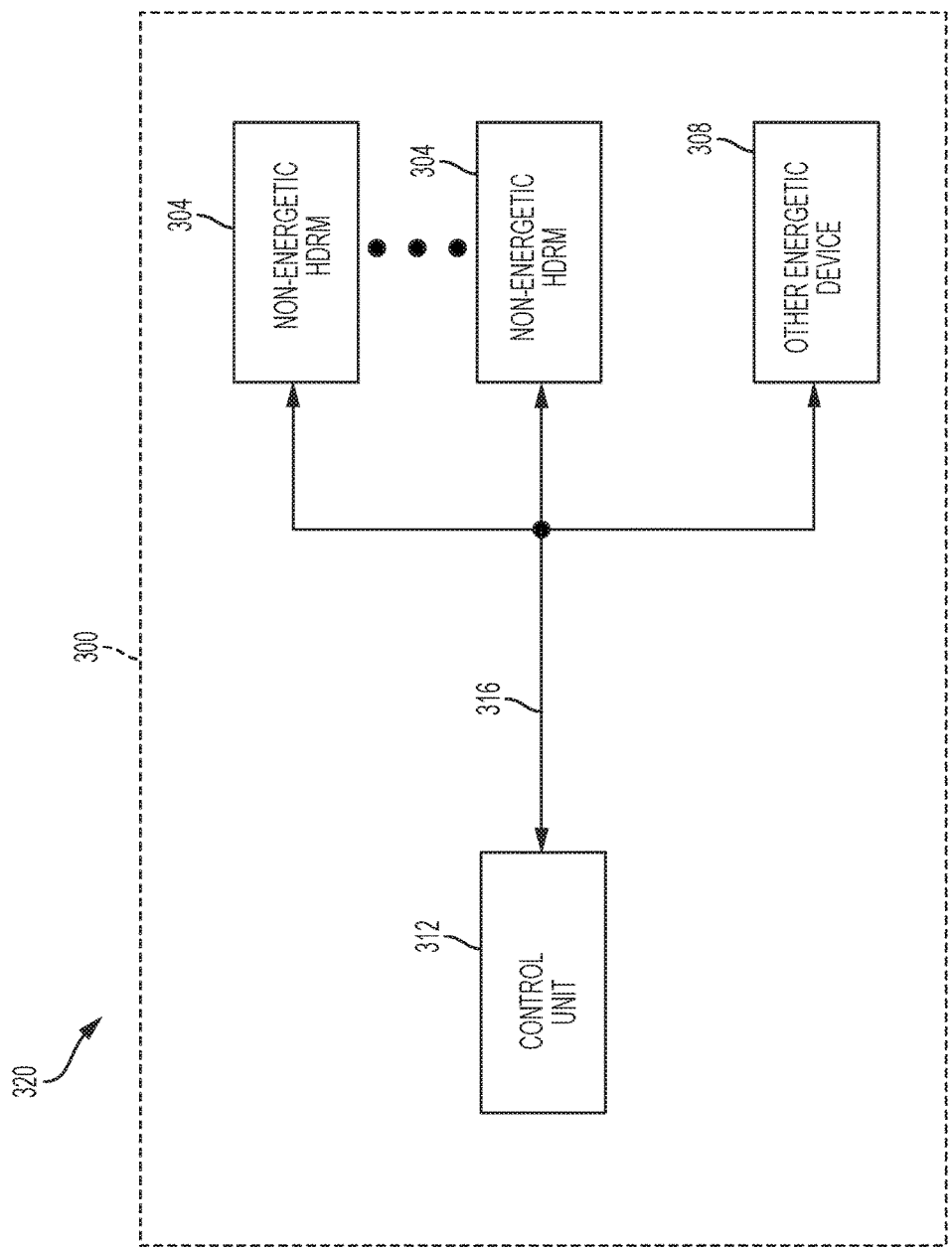
FIG. 3 is a schematic block diagram of a networked initiation system for use with one or more of each of non-energetic HDRMs and other (generic) energetic devices according to an embodiment of the present invention.

Referring now to FIG. 3, a networked initiation system 300 according to yet another embodiment of the present invention includes one or more (i.e., "at least one") non-energetic HDRMs 304, together with one or more (i.e., "at least one") other (generic) energetic devices 308 (e.g., a pyro valve). The networked initiation system 300 also includes a control unit 312 and an interface bus 316 connected between all of the non-energetic HDRMs 304 and the other energetic devices 308 as well as to the control unit 312, thereby allowing for two-way communication between all of the devices connected to the bus 316. Similar to the networked initiation systems 100, 200 of FIGS. 1 and 2, all of the devices 304, 308, 312, and the bus 316 are connected together in a "network" type configuration in the system 300 of FIG. 3.

The embodiment of the networked initiation system 300 of FIG. 3 is somewhat similar to the embodiment of the networked initiation system 100 of FIG. 1, primarily except for the addition of the other energetic devices 308 to the system 300. As such, the description of the networked initiation system 100 given hereinabove with respect to FIG. 1 is mostly applicable to the networked initiation system 300 of FIG. 3. Also, the system 300 of FIG. 3 may be referred to as a "mixed" type of networked initiation system 300. Further, similar to the systems 100, 200 of FIGS. 1 and 2, the networked initiation system 300 of FIG. 3 may be part of an aeronautical or aerospace type vehicle 320 utilized for travel away from the Earth's surface, or may be part of a land based vehicle or installation, or an underground installation.

Figure 4:
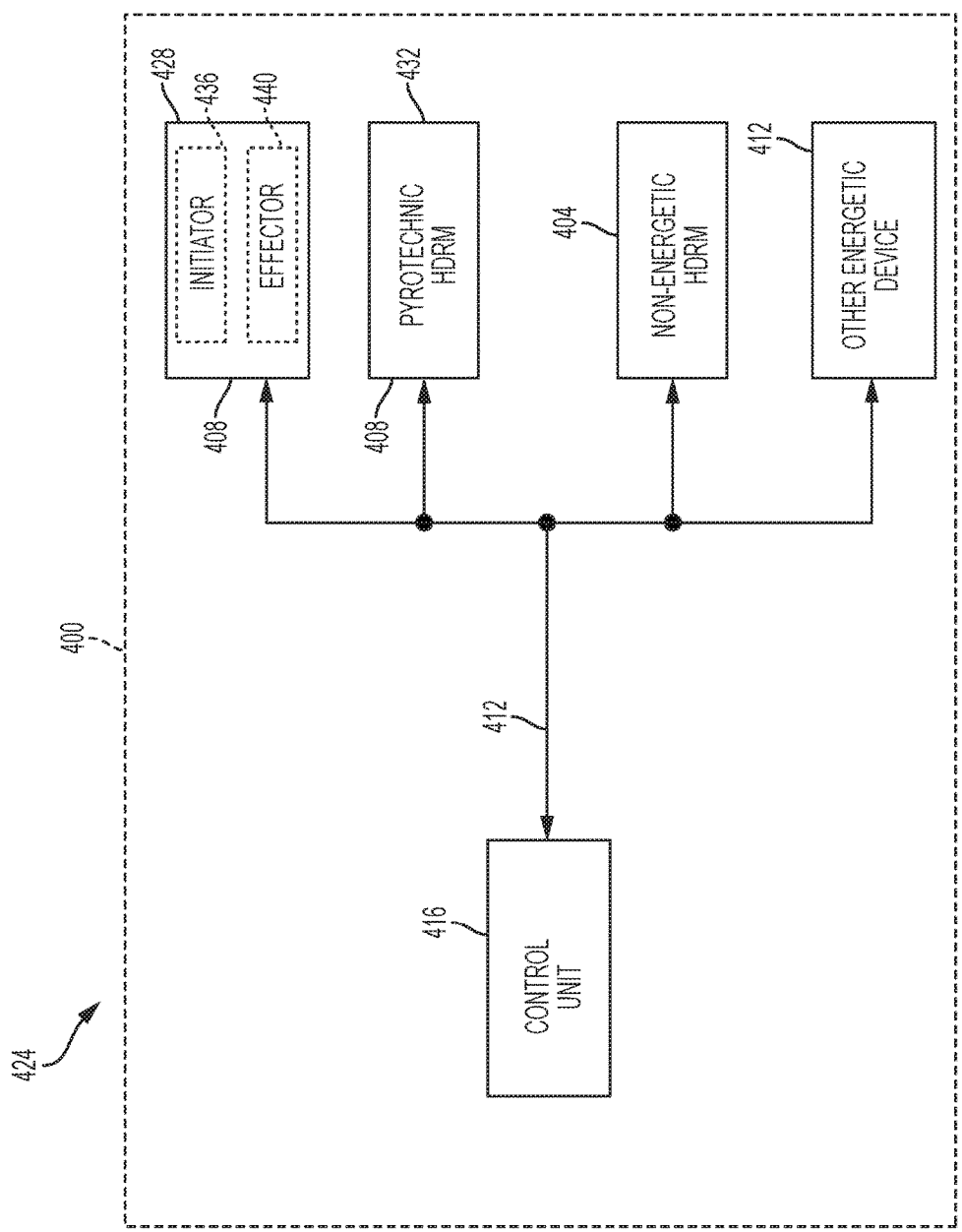
FIG. 4 is a schematic block diagram of a networked initiation system for use with one or more of each of non-energetic HDRMs, energetic HDRMs and other (generic) energetic devices according to an embodiment of the present invention.

Referring now to FIG. 4, a networked initiation system 400 according to still another embodiment of the present invention includes one or more (i.e., "at least one") non-energetic HDRMs 404, together with one or more (i.e., "at least one") energetic HDRMs 408, and one or more (i.e., at least one) other (generic) energetic devices 412 (e.g., a pyro valve). The networked initiation system 400 also includes a control unit 416 and an interface bus 420 connected between all of the devices 404, 408, 412 as well as to the control unit 416, thereby allowing for two-way communication between all of the devices 404, 408, 412 and the control unit 416 connected to the bus 420. Similar to the networked initiation systems 100, 200, 300 of FIGS. 1, 2 and 3, all of the devices 404,408, 412, the control unit 416 and the bus 420 are connected together in a "network" type configuration in the system 400 of FIG. 4.

The embodiment of the networked initiation system 400 of FIG. 4 is somewhat similar to the embodiments of the networked initiation systems 100, 200, 300 of FIGS. 1, 2 and 3. However, the mixed system 400 of FIG. 4 includes the three types of devices described hereinabove in the embodiments of FIGS. 1, 2 and 3. As such, the description of the networked initiation systems 100, 200, 300 given hereinabove with respect to FIGS. 1, 2 and 3 is mostly applicable to the networked initiation system 400 of FIG. 4. Also, similar to the systems 100, 200, 300 of FIGS. 1, 2 and 3, the networked initiation system 400 of FIG. 4 may be part of an aeronautical or aerospace type vehicle 424 utilized for travel away from the Earth's surface, or may be part of a land based vehicle or installation, or an underground installation.

Also, similar to the networked initiation system 200 of FIG. 2, the energetic HDRMs 408 may be either explosive or pyrotechnic in nature. For example, FIG. 4 depicts both an explosive HDRM 428 and a pyrotechnic HDRM 432 as separate devices. In addition, similar to FIG. 2, the energetic HDRM 206 typically comprises an initiator 436 and an effector 440, as shown in FIG. 4 for the explosive HDRM 428.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A networked initiation system, comprising:
    a control unit;
    at least one non-energetic hold-down and release mechanism ("HDRM") configured to hold in place an element and to release the held element upon receipt of an activate command from the control unit;
    a first circuitry associated with the at least one non-energetic HDRM, the first circuitry arranged for arming and firing the at least one non-energetic HDRM associated with the first circuitry, the first circuitry addressable by the control unit;
    at least one additional HDRM configured to hold in place at least one additional element and to release the held at least one additional element upon receipt of an activate command from the control unit;
    a second circuitry associated with the at least one additional HDRM, the second circuitry arranged for arming and firing the at least one additional HDRM associated with the second circuitry, the second circuitry addressable by the control unit; and
    an interface bus configured to connect together the control unit, the first circuitry, and the second circuitry, to provide power from the control unit to each HDRM and each circuitry, and to communicate between the control unit and each HDRM and circuitry,
    wherein an energetic HDRM is at least one of explosive and pyrotechnic, and a non-energetic HDRM is neither explosive nor pyrotechnic,
    wherein the first circuitry and the second circuitry are each uniquely identifiable for communication with the control unit.

2. The networked initiation system of claim 1, wherein the at least one non-energetic HDRM is configured to release the held element upon receipt of the activate command from the control unit by breaking a link wire.

3. The networked initiation system of claim 1, wherein the at least one non-energetic HDRM comprises a firing capacitor that stores electrical energy upon receipt of an arming command from the control unit.

4. The networked initiation system of claim 3, wherein the firing capacitor releases the stored electrical energy upon the at least one non-energetic HDRM being responsive to the activate command from the controller.

5. The networked initiation system of claim 3, wherein the firing capacitor stores electrical energy provided by the interface bus.

6. The networked initiation system of claim 1, wherein the at least one non-energetic HDRM obtains firing energy directly from the interface bus.

7. The networked initiation system of claim 1, wherein the at least one non-energetic HDRM comprises a split spool release device ("SSRD") having a link wire that breaks upon application of electrical energy upon receipt by the at least one non-energetic HDRM of the activate command from the control unit.

8. The networked initiation system of claim 1, wherein the at least one additional HDRM is an energetic HDRM.

9. The networked initiation system of claim 8, wherein the at least one energetic HDRM comprises an initiator and an effector, wherein the initiator is configured to be responsive to the activate command from the control unit to initiate the effector to release the held element.

10. A networked initiation system, comprising:
    a control unit;
    at least one non-energetic hold-down and release mechanism ("HDRM") configured to hold in place one of number of elements and to release the held element upon receipt of an activate command from the control unit;
    a first circuitry associated with the at least one non-energetic HDRM, the first circuitry arranged for arming and firing the at least one non-energetic HDRM associated with the first circuitry, the first circuitry addressable by the control unit;
    at least one energetic device configured to hold in place another one of the number of elements and to release the held element upon receipt of an activate command from the control unit;
    a second circuitry associated with the at least one energetic device, the second circuitry arranged for arming and firing the at least one energetic device associated with the second circuitry, the second circuitry addressable by the control unit; and
    an interface bus configured to connect together the control unit, the first circuitry, and the second circuitry, to provide power from the control unit to the at least one non-energetic HDRM, the at least one energetic device, and each circuitry, and to communicate between the control unit and the at least one non-energetic HDRM, the at least one energetic device, and each circuitry,
    wherein an energetic HDRM is at least one of explosive and pyrotechnic, and a non-energetic HDRM is neither explosive nor pyrotechnic,
    wherein the first circuitry and the second circuitry are each uniquely identifiable for communication with the control unit.

11. The networked initiation system of claim 10, wherein the at least one energetic device comprises a pyro valve.

12. The networked initiation system of claim 10, wherein the at least one non-energetic HDRM comprises a split spool release device ("SSRD") having a link wire that breaks upon application of electrical energy upon receipt by the at least one non-energetic HDRM of the activate command from the control unit.

13. The networked initiation system of claim 10, wherein the at least one non-energetic HDRM is configured to release the held element upon receipt of the activate command from the control unit by breaking a link wire.

14. The networked initiation system of claim 10, wherein the at least one non-energetic HDRM comprises a firing capacitor that stores electrical energy upon receipt of an arming command from the control unit, wherein the firing capacitor releases the stored electrical energy upon the at least one non-energetic HDRM being responsive to the activate command from the controller, and wherein the firing capacitor stores electrical energy provided by the interface bus.

15. The networked initiation system of claim 10, wherein the at least one non-energetic HDRM obtains firing energy directly from the interface bus.

16. A networked initiation system, comprising:
a control unit;
at least one non-energetic hold-down and release mechanism ("HDRM") configured to hold in place one of number of elements and to release the held element upon receipt of an activate command from the control unit;
a first circuitry associated with the at least one non-energetic HDRM, the first circuitry arranged for arming and firing the at least one non-energetic HDRM associated with the first circuitry, the first circuitry addressable by the control unit;
at least one energetic HDRM configured to hold in place another one of the number of elements and to release the held element upon receipt of an activate command from the control unit;
a second circuitry associated with the at least one additional HDRM, the second circuitry arranged for arming and firing the at least one additional HDRM associated with the second circuitry, the second circuitry addressable by the control unit;
at least one other energetic device configured to hold in place another one of the number of elements and to release the held element upon receipt of an activate command from the control unit;
a third circuitry associated with the at least one other energetic device, the third circuitry arranged for arming and firing the at least one other energetic device associated with the third circuitry, the third circuitry addressable by the control unit; and
an interface bus configured to connect together the control unit and each circuitry, to provide power from the control unit to each circuitry, HDRM, and energetic device, and to communicate between the control unit and each circuitry, HDRM, and energetic device,
wherein an energetic HDRM is at least one of explosive and pyrotechnic, and a non-energetic HDRM is neither explosive nor pyrotechnic,
wherein the first circuitry, the second circuitry, and the third circuitry are each uniquely identifiable for communication with the control unit.

17. The networked initiation system of claim 16, wherein the at least one other energetic device comprises a pyro valve.

18. The networked initiation system of claim 16, wherein the at least one energetic HDRM comprises an initiator and an effector, wherein the initiator is configured to be responsive to the activate command from the control unit to initiate the effector to release the held element.

19. The networked initiation system of claim 16, wherein the at least one non-energetic HDRM comprises a split spool release device ("SSRD") having a link wire that breaks upon application of electrical energy upon receipt by the at least one non-energetic HDRM of the activate command from the control unit.

20. The networked initiation system of claim 16, wherein the at least one non-energetic HDRM obtains firing energy directly from the interface bus.

* * * * *